United States Patent [19]
Kitahara et al.

[11] Patent Number: 5,261,241
[45] Date of Patent: Nov. 16, 1993

[54] REFRIGERANT

[75] Inventors: Koichi Kitahara, Fujisawa; Yoshiki Matsumoto, Isehara; Masayuki Fujisawa, Hiratsuka; Isao Nagatsu, Atami; Miyoko Hiramoto, Isehara; Shigeo Ariki, Yokohama, all of Japan

[73] Assignee: Japan Pionics Co., Ltd., Tokyo, Japan

[21] Appl. No.: 827,601

[22] Filed: Jan. 29, 1992

[30] Foreign Application Priority Data

| Feb. 8, 1991 | [JP] | Japan | 3-104013 |
| Jul. 12, 1991 | [JP] | Japan | 3-266779 |
| Aug. 26, 1991 | [JP] | Japan | 3-092774[U] |
| Sep. 30, 1991 | [JP] | Japan | 3-100059[U] |
| Sep. 30, 1991 | [JP] | Japan | 3-100060[U] |

[51] Int. Cl.$^5$ .............................. F25D 5/00
[52] U.S. Cl. .................. 62/4; 165/104.12; 252/70
[58] Field of Search .......... 62/4; 165/104.12; 252/70

[56] References Cited

U.S. PATENT DOCUMENTS

| 3,429,315 | 2/1969 | McDonald | 62/4 |
| 3,719,225 | 3/1973 | Mekjean | 165/104.12 |
| 3,957,472 | 5/1976 | Donnelly | 62/4 |
| 4,273,666 | 6/1981 | Lane et al. | 252/70 |
| 4,402,846 | 9/1983 | Lane et al. | 252/70 |
| 4,585,573 | 4/1986 | Yanadori et al. | 252/70 |
| 4,613,444 | 9/1986 | Lane et al. | 252/70 |
| 4,715,978 | 12/1987 | Yano et al. | 252/70 |
| 4,848,994 | 7/1989 | Rockenfeller | 62/4 |

FOREIGN PATENT DOCUMENTS

| 0402304 | 12/1990 | European Pat. Off. |
| 57-27145 | 6/1982 | Japan |
| 180579 | 10/1983 | Japan |
| 62-96583 | 5/1987 | Japan |
| 62-112678 | 5/1987 | Japan |
| 63-35682 | 2/1988 | Japan |
| 64-24882 | 1/1989 | Japan |
| 1-230689 | 1/1989 | Japan |
| 1-203490 | 8/1989 | Japan |
| 1-289889 | 11/1989 | Japan |
| 1-319583 | 12/1989 | Japan |

OTHER PUBLICATIONS

"Endothermic Reaction at Room Temperature" (Spectrum 23; UNIE 1985, pp. 8-9).
European Search Report w/attached Annex, dated May 19, 1992.
World Patents Index, (online), Accession No. 82-49 230E, Derwent Publications Ltd., London.
World Patents Index (online), Accession No. 76-76 765X, Derwent Publications Ltd., London.

Primary Examiner—Ronald C. Capossela
Attorney, Agent, or Firm—Staas & Halsey

[57] ABSTRACT

A refrigerant containing two or more constituent components that exhibit an endothermic action when mixed with each other, the refrigerant including, as the constituent components, an inorganic salt and a salt hydrate containing at least a hydrate of strontium hydroxide. The refrigerant has a superior cooling capability such as a low attainable cooling temperature and a long duration of the cooled state, and also has no fear of melting or deterioration even where the atmospheric temperature is increased during storage.

22 Claims, 1 Drawing Sheet

REFRIGERANT

BACKGROUND OF THE INVENTION

1. Technical Field

The present invention relates to a refrigerant, and more particularly to a refrigerant used to effect cooling by utilization of an endothermic action produced upon mixing of two or more constituent components.

2. Background Art

As simple cooling materials which need no electric sources, a cold accumulator using such substances as having large heat accumulating capacity, and a refrigerant utilizing an endothermic action produced upon mixing of two or more constituent components have conventionally been known. Those materials have recently become popular as means for simply cooling human bodies, food products, etc. Among them, the former cold accumulator is inconvenient in that it must be kept in a refrigerator or freezer for cooling before use. On the other hand, the latter refrigerant has an advantage that a cooling effect can be obtained just by mixing at least two kinds of constituent components without requiring any cooling operation in advance.

Such a refrigerant is given by a combination of an inorganic salt, such as an ammonium salt or alkaline metallic, and water, a combination of an inorganic salt and a salt hydrate holding crystal water, or a salt hydrate combined with water. Examples of the inorganic ammonium salt are an ammonium nitrate, ammonium chloride, ammonium sulfate and ammonium bromide. As examples of the salt hydrate holding crystal water, there are conventionally known a 10-hydrate of sodium carbonate, a 7-hydrate of sodium carbonate, a 10-hydrate of sodium sulfate, a 12-hydrate of disodium phosphate, etc.

The refrigerants using crystals of salt hydrates have a little higher cooling effect than the refrigerants using water. Further, the former has no fear of breakage of bags in which the refrigerant is contained, and also has a higher degree of safety in handling. However, that refrigerant has not been satisfactory from the standpoint of practical use for the following reasons. The attainable cooling temperature is on the order of $-10°$ C. at maximum. Where the atmospheric temperature is in excess of 40° C. during storage within warehouses in the summer season, the salt hydrates are melted and, therefore, the endothermic amount obtainable in use is reduced to a large extent. When the atmospheric temperature is lowered again after the melting, the salt hydrates are recrystallized into the form of aggregates. Accordingly, even if the recrystallized salt hydrates are mixed with ammonium salts, the expected cooling effect can no longer be attained.

As salt hydrates which will not melt even under the atmospheric temperature beyond 40° C., there are known a 9-hydrate of sodium methasilicate, a 6-hydrate of magnesium chloride and a 10-hydrate of sodium tetraborate, for example. However, those salt hydrates except for the 9-hydrate of sodium methasilicate hardly exhibit an endothermic action when mixed with ammonium salts. Although the 9-hydrate of sodium methasilicate exhibits a relatively satisfactory cooling effect when mixed with an ammonium salt, there accompanies a shortcoming as follows. Because the reaction between the 9-hydrate of sodium methasilicate and the ammonium salt is slow when the former is used solely, the temperature in a central portion is lowered, but the temperature in an outer wall portion is not so lowered if both the constituent components are accommodated in a bag or container. As a result, it is difficult to make users feel cool satisfactorily in practical use. Thus, to date, there has not been obtained a refrigerant which develops a great cooling effect, shows no melting of crystals even at the high atmospheric temperature on the order of 40° C., and can make users feel cool satisfactorily.

Meanwhile, the refrigerants using water have such an advantage that the water and the other constituent component can be easily mixed with each other and the cooling effect is rapidly developed in the beginning stage. However, the combination of an inorganic salt and water has not been alone satisfactory from the standpoint of practical use for the reasons that the cooling capability is low and a sufficient cool feeling cannot be obtained especially when it is used under the high atmospheric temperature above 30° C.

SUMMARY OF THE INVENTION

It is, therefore, an object of the present invention to provide a refrigerant which has a high cooling capability and can make users feel cool sufficiently even at a high atmospheric temperature. Another object of the present invention is to provide a refrigerant which has a high cooling capability and also has no fear of melting or deterioration even where the atmospheric temperature is increased during storage.

The present invention is intended to realize an objective refrigerant by using a hydrate of strontium hydroxide. More specifically, the present invention provides a refrigerant containing two or more constituent components which exhibit an endothermic action when mixed with each other, the refrigerant including an inorganic salt and a salt hydrate containing at least a hydrate of strontium hydroxide. The inorganic salt and the salt hydrate are contained in the refrigerant as the whole or a part of the constituent components.

In a refrigerant using a salt hydrate as a constituent component adapted to give rise to an endothermic reaction when mixed with inorganic salts, the salt hydrate may be one containing at least a hydrate of strontium hydroxide. On the other hand, in a refrigerant using water or a salt hydrate combined with water as a constituent component adapted to give rise to an endothermic reaction when mixed with inorganic salts, the refrigerant is required to comprise a salt hydrate containing at least a hydrate of strontium hydroxide, the salt hydrate being then added with a predetermined amount of water.

Adding the hydrate of strontium hydroxide can achieve such advantages that a cooling effect of the refrigerant is enhanced and the refrigerant will not melt or denature even where the atmospheric temperature is increased during storage.

Among various hydrates of strontium hydroxide, an 8-hydrate of strontium hydroxide is preferable because it exhibits the maximum endothermic amount produced when mixed with inorganic salts. Purity of the 8-hydrate of strontium hydroxide has no special limitations, but it is usually not less than 90%, preferably not less than 99%. Note that small amounts of 7-hydrates and 1-hydrates of strontium hydroxide, a strontium anhydride, etc. are mixed into the 8-hydrate of strontium hydroxide in the production process thereof, which may slightly reduce the endothermic amount in comparison with the pure 8-hydrate, but such a mixing of other ingredients will not bring about any significant adverse influence.

Examples of the inorganic salt used in the present invention are an inorganic ammonium salt such as an ammonium nitrate, ammonium sulfate, ammonium disulfate, ammonium phosphate, ammonium dihydrogenphosphate, ammonium methavanadate, ammonium chloride, ammonium bromide, ammonium iodide, and/or an alkaline metallic salt, specifically a metallic nitrate, such as a sodium nitrate and potassium nitrate. Among those examples, an ammonium nitrate, ammonium chloride, ammonium bromide and ammonium sulfate are preferable, among which an ammonium nitrate is particularly preferable. The inorganic salt may be a single kind of salt or a combination of plural kinds of salts.

The salt hydrate used in the present invention may include, beside a hydrate of strontium hydroxide, one or more than one of known salt hydrates such as a 6-hydrate of magnesium chloride, a 10-hydrate of sodium tetraborate, a 10-hydrate of sodium carbonate, a 7-hydrate of sodium carbonate, a 10-hydrate of sodium sulfate and a 12-hydrate of magnesium phosphate. Among the known salt hydrates, it is preferable to contain at least one of a 9-hydrate of sodium methasilicate and an 8-hydrate of barium hydroxide for the reasons of preventing an extremely supercooled state, further prolonging a duration of the cooled state, and enhancing efficiency of mixing with inorganic salts.

Any of various highly water-absorptive substances and viscosity improvers can be added to the refrigerant of the present invention for the purpose such as adjusting the cooling capability of the refrigerant. Examples of those additives are starch, carboxymethylcellulose, alginic acid, gelatin, a graft copolymer of starch—acrylic acid, a copolymer of maleic acid, a copolymer of vinyl acetate—acrylic acid ester, polyvinylalcohol and polyacrylic acid.

Further, urea can be added to the refrigerant of the present invention along with an inorganic salt for purposes such as enhancing the cooling capability. The urea may be added in the form combined with the inorganic salt or separately therefrom. In this case, the proportion of urea to inorganic salts is usually 1:0.1 to 3.0 in weight ratio, preferably 1:0.2 to 2.0.

Proportions of the respective constituent components in the present refrigerant are optionally determined depending on the objective cooling capability and from the standpoint of preventing the refrigerant from melting or deteriorating even where the atmospheric temperature is increased during storage. For example, the proportion of salt hydrate to inorganic salts is usually 1:0.1 to 10.0 in weight ratio, preferably 1:0.25 to 4.0, more preferably 1:0.5 to 2.0. The weight proportion of hydrate of strontium hydroxide to the whole of salt hydrate is usually not less than 5%, preferably not less than 10%, more preferably not less than 30%.

In the refrigerant using water as a constituent component adapted to give rise to an endothermic reaction when mixed with an inorganic salt, the water is contained in the form combined with a salt hydrate or separate therefrom. The mixing proportion of urea to inorganic salt alone or combined with urea is usually 1:0.1 to 5.0 in weight ratio, preferably 1:0.3 to 3.0. The mixing ratio of water to salt hydrate is set to be in the same range as above. The amount of hydrate of strontium hydroxide mixed together is usually not more than 80%, preferably in a range of 70% to 5% with respect to the total weight of solid constituent components including the inorganic salt alone or combined with urea and the salt hydrate.

Two or more constituent components used in the present invention which exhibit an endothermic action when mixed with each other are accommodated in the same container or separate containers in a mutually isolated condition. More specifically, the inorganic salt and the salt hydrate are accommodated in one or more containers in a condition that they are isolated from each other. In the refrigerant further including water, the inorganic salt and the water are also accommodated in one or more containers in a condition such that they are isolated from each other. At the time of desiring to effect cooling, such an isolated condition is removed to mix the constituent components with each other so that the components dissolve mutually to proceed to liquidization, whereby an endothermic action is started to effect cooling.

A bag, for example, may be used as the container. Particularly, a flat bag is suitable for the portable purpose.

As means for accommodating a plurality of constituent components to be contained in the refrigerant, there is a mechanism for partitioning the interior of a single flat bag into two spaces, for example, by using a bar-like clip which can clip the flat bag so tightly as to partition the interior of the bag in a sealing manner, or by using a hermetically sealing mechanism such as a combination of a groove provided in one inner side of the flat bag and a rib provided on the other inner side in an opposite relation, the groove and the rib being engaged with each other in a sealing manner, and a mechanism for putting one of the constituent components into a separate container in a sealed state, such as a small bag or capsule, which can be easily broken upon an impact or pressure being applied from the exterior, and then accommodating such a container in a larger flat bag along with the other constituent component. The shape of the flat bag has no special limitations and may be rectangular, square, circular or elliptical, for example.

In the case of the mechanism of putting a small bag into another larger bag, if the impact strength of the small bag is weak, it might be broken during transportation and a desired cooling effect could not be obtained in use. On the contrary, if the small bag is too high in its impact strength, it could not be broken by forces of women or children, or even the outside bag might also be broken with excessive forces imposed. Further, in the cooling bag adopting such a mechanism, it is hard to visually confirm a broken condition of the inner small bag from the exterior. In contrast, the hermetically sealing mechanism does not suffer from such drawback and is advantageous in that the different kinds of constituent components can be stored in a single bag in a safely isolated condition without contacting with each other, and the isolated condition can be easily removed in use to sufficiently mix the constituent components with each other, with the result of an increased cooling effect.

The above hermetically sealing mechanism may be practiced in various forms: for example, both inner sides of a bag are slightly bonded to each other by heat fusion bonding or an adhesive to extend in the transverse direction at a position near the center of the bag for partitioning the interior of the bag; a partition film, which has the strength weaker than the material of the bag and is easily breakable upon an impact being applied from the exterior, is fixedly provided by bonding with heat fusion or an adhesive at a predetermined position inside the bag for partitioning the interior of the bag; a groove is provided at a predetermined position to extend in the transverse direction in one inner side of the bag and a rib capable of engaging the groove is provided on the other inner side, the groove and the rib being engaged with each other to thereby partition the interior of the bag. Among those practical forms, the hermetically sealing mechanism including a combination of groove and rib is preferable in the points of such as no possible damage to the bag, positive engagement and disengagement, as well as easy handling. The groove and the rib may be provided on the bag material itself in the forming process for manufacture of the bag. Alternatively, a strap-like material provided with the groove and the rib may be fixed by bonding with heat fusion or an adhesive at a predetermined position inside the bag. However, from the viewpoints of formability, productivity and strength, it is preferable to provide the groove and the rib on the bag material itself in the manufacture step of the bag material or in the forming step of the bag. The size and shape of the groove and the rib are optionally selected so long as both the members can be easily fitted to and separated apart from each other by pushing and pulling them with fingers, and the interior of the bag can be divided into isolated spaces in a sealed state.

To easily open the above hermetic sealing engagement in use of the cooling bag, a thumb tab may be provided on the outer side of the bag, if desired. The thumb tab is usually provided on each of both sides of the bag, and the size, shape and strength thereof are optionally selected so long as the sealing engagement can be opened by pinching and pulling the thumb tab with the fingers. The thumb tab may be formed of a rigid synthetic resin, metal piece, film, sheet or cloth. However, a pliable film, sheet, cloth or the like is preferable from the point of preventing the sealing engagement from being obstructively protruded and erroneously opened during storage and transportation of the cooling bag. The thumb tab is attached to the bag at a position near the center of the sealing mechanism by bonding with heat fusion or an adhesive.

As the aforesaid flat bag, a film or sheet is used which is moisture impermeable and allows no leak of the constituent components inside the bag to the exterior. The material of the flat bag has no special limitations and may be, for example, a synthetic resin film or a metal foil as a moisture impermeable film, including a synthetic resin film made of polyethylene, polypropylene, polyester, nylon, polyvinyl chloride, polyvinylidene chloride or polyisocyanate and a composite film formed of two or more of these synthetic resin films, or an aluminum foil and an aluminum laminated film. Among them, the synthetic resin film made of polyethylene, polypropylene, polyester, nylon or polyvinyl chloride and a composite film formed of two or more of these synthetic resin films are preferable from the points of easier laminating process with non-woven cloth and easier commercial availability at the lower cost.

Further, it is preferable to laminate non-woven cloth over the air impermeable film or sheet. Lamination of the non-woven cloth enables the presentation of a good touch feeling, eliminate wetting caused by dew condensation in use, avoid the surface from being cooled more than necessary, and make users feel comfortably cool for a long period of time.

The material of the non-woven cloth has no special limitations and may be, for example, non-woven cloth formed of synthetic resin fibers such as nylon, polyethylene, polypropylene, polyester and polyvinyl chloride, or non-woven cloth formed of natural fibers such as cotton, pulp, flax, wool, silk and rayon. Among these materials, nylon, polyethylene, polypropylene and rayon are preferable from the points of a good touch feeling and easier laminating process with non-woven cloth. Above all, the non-woven cloth made of nylon is particularly preferable.

As to a method of overlaying the non-woven cloth over the moisture impermeable film, both the members may be fixed to each other entirely or partly by lamination using heat fusion or dry lamination using an adhesive. For the purpose of taking advantage of a good touch feeling of non-woven cloth and preventing a wet feeling caused by dew condensation, however, the film and the non-woven cloth are preferably fixed to each other slightly over the entire surface, or partly in dot or line patterns.

It is further preferable to mix a coloring agent as at least one of the constituent components to be contained in the refrigerant of the present invention. Addition of such a coloring agent permits users to precisely judge the mixed condition of the plural constituent components, thereby ensuring a superior cooling effect. That addition also enables the adjustment of the mixing speed in such a manner as to quickly effect cooling or prolong the duration of the cooled state for sufficiently developing the cooling capability at the discretion of users. As a result, a comfortable cool feeling can be obtained.

The coloring agent is mixed with the inorganic salt or the salt hydrate. In the case of mixing the coloring agent with each of the inorganic salt and the salt hydrate, coloring agents in different colors are used. For the refrigerant including water, the coloring agent may be mixed with water.

The coloring agent may be any of various natural and synthetic ones such as pigments, dyes, food additives for coloring and pH indicators, and is selected depending on the kind of refrigerant. The pigments include, for example, silver cinnabar, ultramarine, deep blue, titanium yellow, molybdenum red, emerald green, cobalt blue, phthalocyanine blue, and dioxazine violet. The dyes include, for example, dispersed dyes, cation dyes, basic dyes, and direct dyes. The food additives for coloring include, for example, red No. 2, No. 3, No. 102, No. 104, No. 105 and No. 106, yellow No. 4 and No. 5, green No. 3, as well as blue No. 1 and No. 2. The pH indicators include, for example, methyl orange, methyl red, phenolphthalein, phenol red, bromcresol green, bromthymol blue, and thymolphtalein. Among them, the blue-base coloring agents such as ultramarine, deep blue and blue No. 1 and No. 2 are preferable in the points of visually associating a cool feeling.

The mixing proportion of the coloring agent is dependent on the kind of agent itself and the kinds of constituent components of the refrigerant and, therefore, cannot be determined as a general rule. However, it is usually in a range of 0.00001% to 10% with respect to the weight of the refrigerant, preferably in a range of 0.0001% to 1%.

The flat bag in which the refrigerant mixed with the coloring agent is to be accommodated, needs to include a transparent portion in the whole or partial area. Preferably, at least one side of the flat bag is entirely formed of a colorless, transparent material by employing a synthetic resin film in usual cases.

DESCRIPTION OF THE PREFERRED EMBODIMENTS

Example 1

Ammonium nitrate of 25 g and an 8-hydrate of strontium hydroxide of 25 g were put in a glass beaker of 100 ml at the atmospheric temperature of 20° C. and agitated by using a glass rod for mixing. Thermometers were then attached to the center and outer wall of the beaker to measure the minimum temperatures at the center and outer wall and durations of the cooled state not higher than 10° C. for determining the mean temperatures not higher than 10° C. at both the measurement points and a cooling temperature area not higher than 10° C. at the outer wall. Note that the cooling temperature area is obtained by measuring the temperature at intervals of 10 seconds from the time at which the outer wall temperature lowers below 10° C. to the time point at which it rises back to 10° C. again via the minimum temperature, multiplying the difference between the measured value and 10° C. by 10/60, and then integrating the multiplied values, and is indicated in units of °C.min.

Example 2

The cooling temperatures were measured in the same manner as Example 1 except that ammonium nitrite of 17 g and an 8-hydrate of strontium hydroxide of 33 g were used.

Example 3

The cooling temperatures were measured in the same manner as Example 1 except that ammonium nitrate of 30 g and an 8-hydrate of strontium hydroxide of 20 g were used.

Example 4

The cooling temperatures were measured in the same manner as Example 1 except that, in place of using ammonium nitrate, ammonium bromide of 14 g was mixed with an 8-hydrate of strontium hydroxide of 36 g.

Example 5

The cooling temperatures were measured in the same manner as Example 1 except that, in place of using ammonium nitrate, ammonium chloride of 25 g was mixed with an 8-hydrate of strontium hydroxide of 25 g.

Example 6

The cooling temperatures were measured in the same manner as Example 1 except that an 8-hydrate of strontium hydroxide of 12.5 g and a 9-hydrate of sodium methasilicate of 12.5 g were mixed with ammonium nitrate of 25 g.

Example 7

The cooling temperatures were measured in the same manner as Example 1 except that an 8-hydrate of strontium hydroxide of 30 g and a suspension (smica gel) of copolymer of vinyl acetate and acrylic acid ester, as a water-absorptive substance, of 3 g were mixed with ammonium nitrate of 17 g. The mixing proportions of the constituent components and the obtained results in Examples 1 to 7 are listed in Tables 1 and 2, respectively.

TABLE 1

| | Mixing Proportions in Refrigerant (at atmospheric temperature of 20° C.) | | | |
|---|---|---|---|---|
| Example | Ammonium Salt | | (A) | Other Mixed |
| 1 | ammonium nitrate | 25 g | 25 g | — |
| 2 | ammonium nitrate | 17 g | 33 g | — |
| 3 | ammonium nitrate | 30 g | 20 g | — |
| 4 | ammonium bromide | 14 g | 36 g | — |
| 5 | ammonium chloride | 25 g | 25 g | — |
| 6 | ammonium nitrate | 25 g | 12.5 g | (B) 12.5 g |
| 7 | ammonium nitrate | 17 g | 30 g | smica gel 3 g |

(A): 8-hydrate of strontium hydroxide
(B): 9-hydrate of sodium methasilicate

TABLE 2

| | Center | | | Outer Wall | | | |
|---|---|---|---|---|---|---|---|
| Ex. | Min Temp. (°C.) | Duration (min) | Mean Temp. (°C.) | Min Temp. (°C.) | Duration (min) | Mean Temp. (°C.) | Temp. Area (°C. · min) |
| 1 | −30 | 43 | −4 | −9 | 32 | 0 | 316 |
| 2 | −24 | 43 | −4 | −8 | 32 | 0 | 300 |
| 3 | −22 | 38 | −2 | −6 | 28 | 2 | 283 |
| 4 | −10 | 35 | 2 | 0 | 25 | 4 | 153 |
| 5 | −20 | 33 | 0 | −4 | 26 | 2 | 176 |
| 6 | −15 | 60 | −3 | −4 | 39 | 4 | 231 |
| 7 | −20 | 50 | −2 | −4 | 35 | 0 | 300 |

Comparative Example 1

Ammonium nitrate of 25 g and pure water of 25 g were put in a glass beaker of 100 ml at the atmospheric temperature of 20° C. and agitated by using a glass rod for mixing. Thermometers were then attached to the center and outer wall of the beaker to measure the minimum temperatures at the center and outer wall and durations of the cooled state not higher than 10° C. for determining the mean temperatures not higher than 10° C. at both the measurement points and the cooling temperature area not higher than 10° C. at the outer wall.

Comparative Example 2

The cooling temperatures were measured in the same manner as Comparative Example 1 except that ammonium nitrate of 17 g and pure water of 18 g were used.

Comparative Example 3

The cooling temperatures were measured in the same manner as Comparative Example 1 except that, in place of using pure water, a 9-hydrate of sodium methasilicate of 25 g was mixed with ammonium nitrate of 25 g.

Comparative Example 4

The cooling temperatures were measured in the same manner as Comparative Example 1 except that, in place of using pure water, a 10-hydrate of sodium carbonate of 23 g was mixed with ammonium nitrate of 27 g.

Comparative Example 5

The cooling temperatures were measured in the same manner as Comparative Example 1 except that, in place of using pure water, a 6-hydrate of magnesium chloride of 25 g was mixed with ammonium nitrate of 27 g.

Comparative Example 6

The cooling temperatures were measured in the same manner as Comparative Example 1 except that, in place of using pure water, a 10-hydrate of sodium tetraborate of 25 g was mixed with ammonium nitrate of 25 g.

Comparative Example 7

The cooling temperatures were measured in the same manner as Comparative Example 1 except that, in place of using ammonium nitrate and pure water, a 9-hydrate of sodium methasilicate of 25 g was mixed with ammonium bromide of 25 g. The mixing proportions of the constituent components and the obtained results in Comparative Examples 1 to 7 are listed in Tables 1 and 4, respectively.

TABLE 3

| | Mixing Proportions in Refrigerant (at atmospheric temperature of 20° C.) | | | |
|---|---|---|---|---|
| Com. Ex. | Ammonium Salt | | Water or Salt Hydrate | |
| 1 | ammonium nitrate | 25 g | water | 25 g |
| 2 | ammonium nitrate | 32 g | water | 18 g |
| 3 | ammonium nitrate | 25 g | (A) | 25 g |
| 4 | ammonium nitrate | 27 g | (B) | 25 g |
| 5 | ammonium nitrate | 25 g | (C) | 25 g |
| 6 | ammonium nitrate | 25 g | (D) | 25 g |
| 7 | ammonium bromide | 25 g | (A) | 25 g |

(A): 9-hydrate of sodium methasilicate
(B): 10-hydrate of sodium carbonate
(C): 6-hydrate of magnesium chloride
(D): 10-hydrate of tetraborate

TABLE 4

| | Center | | | Outer Wall | | | |
|---|---|---|---|---|---|---|---|
| Com. Ex. | Min Temp. (°C.) | Duration (min) | Mean Temp. (°C.) | Min Temp. (°C.) | Duration (min) | Mean Temp. (°C.) | Temp. Area (°C. · min) |
| 1 | −6 | 9 | 2 | 2 | 7 | 4 | 52 |
| 2 | −6 | 17 | 4 | 2 | 17 | 6 | 77 |
| 3 | −14 | 63 | −3 | 0 | 22 | 6 | 120 |
| 4 | −11 | 67 | −1 | 2 | 20 | 8 | 115 |
| 5 | 20 | (not cooled) | | 20 | | | |
| 6 | 20 | (not cooled) | | 20 | | | |
| 7 | 0 | 10 | 4 | 3 | 6 | 8 | 45 |

Example 8

Ammonium nitrate of 25 g and an 8-hydrate of strontium hydroxide of 25 g were put in a glass beaker of 100 ml at the atmospheric temperature of 40° C. and agitated by using a glass rod for mixing. A thermometer was then attached in place to measure the minimum temperature, a duration of the cooled state not higher than 10° C., and the mean temperatures not higher than 10° C. at the center of the beaker.

Example 9

The cooling temperatures were measured in the same manner as Example 8 except that, in place of using ammonium nitrate, ammonium bromide of 14 g was mixed with an 8-hydrate of strontium hydroxide of 36 g.

Example 10

The cooling temperatures were measured in the same manner as Example 8 except that an 8-hydrate of strontium hydroxide of 12.5 g and a 9-hydrate of sodium methasilicate of 12.5 g were mixed with ammonium nitrate of 25 g. The mixing proportions of the constituent components and the obtained results in Examples 8 to 10 are listed in Tables 5 and 6, respectively.

TABLE 5

| | Mixing Proportions in Refrigerant (at atmospheric temperature of 40° C.) | | | | |
|---|---|---|---|---|---|
| Example | Ammonium Salt | | (A) | | Other Mixed |
| 8 | ammonium nitrate | 25 g | 25 g | | — |
| 9 | ammonium bromide | 14 g | 36 g | | — |
| 10 | ammonium nitrate | 25 g | 12.5 g | | (B) 12.5 g |

(A): 8-hydrate of strontium hydroxide
(B): 9-hydrate of sodium methasilicate

TABLE 6

| | Center | | |
|---|---|---|---|
| Example | Min Temp. (°C.) | Duration (min) | Mean Temp. (°C.) |
| 8 | −23 | 24 | −3 |
| 9 | −2 | 15 | 3 |
| 10 | −11 | 37 | −2 |

Example 11

A mixture of water 30 g and an 8-hydrate of strontium hydroxide of 20 g was put in a small bag formed of polyethylene in a sealing manner. This small bag was accommodated in an outside bag formed of an aluminum laminated film along with ammonium nitrate of 80 g, followed by hermetic sealing to prepare a sample of the refrigerant.

An impact was applied to the refrigerant from the exterior at the atmospheric temperature of 36° C. to break the inner small bag formed of polyethylene. A thermometer using a thermocouple was then attached to the surface of the outside bag to measure the temperature with intervals of 10 sec for determining the minimum temperature, the period of time required to reach not higher than 10° C., and a duration of the cooled state not higher than 10° C. The mixing proportions of the constituent components and the obtained results in this Example are listed in Table 7.

Examples 12, 13

The temperature measurement was conducted in the same manner as Example 11 except that the mixing proportions of ammonium nitrate, water and an 8-hydrate of strontium hydroxide were changed. The mixing proportions of the constituent components and the obtained results in these Examples are listed in Table 7.

Comparative Example 8

The temperature measurement was conducted in the same manner as Example 11 except that only ammonium nitrate and water were used without using an 8-hydrate of strontium hydroxide. The mixing proportions of the constituent components and the obtained results in this Example are listed in Table 7.

TABLE 7

Cooling Capability (at atmospheric temperature of 36° C.)

| | Mixing Proportion | | | Measured Result (10° C. or less) | | |
|---|---|---|---|---|---|---|
| | Ammonium Nitrate (g) | Water (g) | (A) (g) | Min Temp. (°C.) | Required Time (min) | Duration (min) |
| Ex. 11 | 80 | 30 | 20 | 6.5 | 0.8 | 5 |
| Ex. 12 | 70 | 20 | 40 | 0.6 | 0.8 | 7 |
| Ex. 13 | 60 | 10 | 60 | −4.2 | 0.8 | 10 |
| Com. Ex. 8 | 90 | 40 | — | 19.9 | — | 0 |

(A): 8-hydrate of strontium hydroxide

Examples 14 to 16

The temperature measurement was conducted in the same manner as Example 11 except that urea was combined with ammonium nitrate and the mixing proportions of water and an 8-hydrate of strontium hydroxide were changed. The mixing proportions of the constituent components and the obtained results in these Examples are listed in Table 8.

Comparative Example 9

The temperature measurement was conducted in the same manner as Example 11 except that only ammonium nitrate combined with urea and water were used without using an 8-hydrate of strontium hydroxide. The mixing proportions of the constituent components and the obtained results in this Example are listed in Table 8.

TABLE 8

Cooling Capability (at atmospheric temperature of 36° C.)

| | Mixing Proportion | | | | Measured Result (10° C. or less) | | |
|---|---|---|---|---|---|---|---|
| | Ammonium Nitrate (g) | Urea (g) | Water (g) | (A) (g) | Min Temp. (°C.) | Req. Time (min) | Duration (min) |
| Ex. 14 | 40 | 40 | 30 | 20 | 2.5 | 0.8 | 6 |
| Ex. 15 | 35 | 35 | 20 | 40 | −3.0 | 0.8 | 8 |
| Ex. 16 | 30 | 30 | 10 | 60 | −8.0 | 0.8 | 11 |
| Com. Ex. 9 | 45 | 45 | 40 | — | 15.0 | — | 0 |

(A): 8-hydrate of strontium hydroxide

Examples 17 to 20

The temperature measurement was conducted in the same manner as Example 11 except that ammonium nitrate used in Examples 11 to 13 as an inorganic salt was changed to another kind of ammonium salt or an alkaline metallic salt, and this inorganic salt, the 8-hydrate of strontium hydroxide and water were mixed separately successively. The mixing proportions of the constituent components and the obtained results in these Examples are listed in Tables 9 and 10, respectively.

TABLE 9

| | Mixing Proportion | | | |
|---|---|---|---|---|
| | Inorganic Salt | (g) | Water (g) | 8-Hydrate of Strontium Hydroxide (g) |
| Example 17 | ammonium nitrate + sodium nitrate | 35 35 | 20 | 40 |
| Example 18 | ammonium nitrate + potassium nitrate | 35 35 | 20 | 40 |
| Example 19 | ammonium bromide | 70 | 20 | 40 |
| Example 20 | ammonium chloride | 70 | 20 | 40 |

TABLE 10

Cooling Capability (at atmospheric temperature of 36° C.)

| | Measured Result (10° C. or less) | | |
|---|---|---|---|
| | Min Temp. (°C.) | Required Time (min) | Duration (min) |
| Example 17 | 0 | 0.8 | 4 |
| Example 18 | 2 | 0.8 | 5 |
| Example 19 | 0 | 1.0 | 4 |
| Example 20 | 5 | 1.0 | 3 |

As will be found from Examples as set forth above, the lower attainable cooling temperature could be realized and the superior cooling capability could be developed as a result of the refrigerant being not melted and deteriorated even at the higher atmospheric temperatures.

Next, the present invention will be described in more detail by way of illustration with reference to the drawings.

Figure 1:
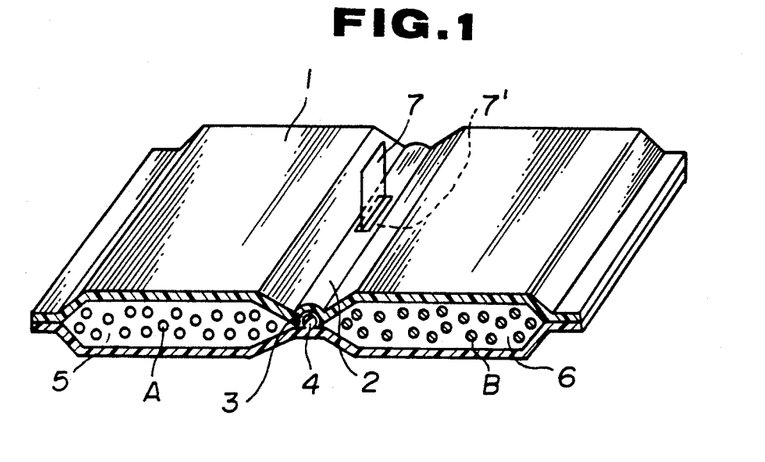
FIG. 1 is a perspective view, broken away, showing the state that a refrigerant of the present invention is accommodated in a bag having a hermetically sealing mechanism.

FIG. 1 is a perspective view, broken away, showing the refrigerant of the present invention accommodated in a cooling bag. In FIG. 1, a hermetically sealing mechanism 2 is provided in a rectangular, flat bag 1 to transversely extend substantially at the center thereof, the bag 1 being formed by placing two moisture impermeable sheets one above the other and bonding the two sheets to each other along their peripheral edges with heat fusion. The sealing mechanism 2 includes a groove 3 provided in the upper inner side of the bag 1 and a rib 4 provided on the lower inner side in an opposite relation to the groove 3, the groove and the rib being engaged with each other to partition the interior of the bag into two spaces 5 and 6 in a hermetically sealing manner. One of the constituent components A which gives rise to an endothermic action when mixed with the other is accommodated in the space 5 and the other constituent component B is accommodated in the space 6 in an isolated condition from each other. A pair of pliable thumb tabs 7 and 7' are attached to the outer upper and lower sides of the bag, respectively, thereby completing a simple cooling bag.

In use of the simple cooling bag, the thumb tabs 7 and 7' are pinched and pulled by the fingers apart to disengage the rib 4 of the sealing mechanism 2 from the groove 3 so that the sealing engagement is opened. By taking the bag 1 with a hand and slightly shaking it to apply vibrations from the exterior under that condition, the constituent components A and B are mixed with each other to start an endothermic action. As a result, the bag 1 is made cold to be used for cooling objects such as human bodies and food products.

A plurality of hermetically sealing mechanisms may be provided on the cooling bag. By way of example, for the purpose of prolonging a duration of the cooled state or increasing stability of the constituent components during storage, it is possible to provide the hermetically sealing mechanisms at two locations to partition the interior of the bag into three spaces, and accommodate an inorganic salt A such as an ammonium salt in the central space and a salt hydrate B in the left and right spaces, or accommodate water C in the right space.

Figure 2:
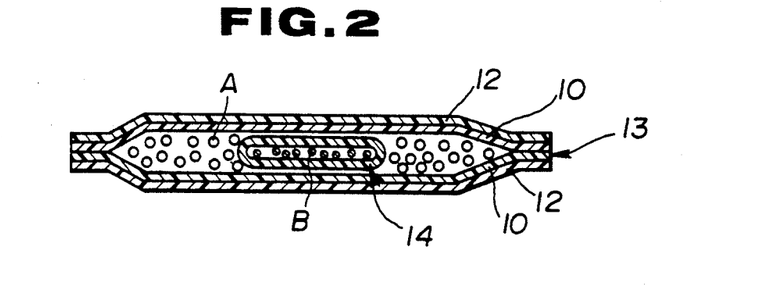
FIG. 2 is a sectional view showing the state that the refrigerant of the present invention is accommodated in a bag formed of an air impermeable film with non-woven cloth laminated thereon.

FIG. 2 shows the state that constituent components A and B of the refrigerant according to the present invention are accommodated in a flat bag 13 which is formed by adjoining two rectangular bag material sheets, each includes a moisture impermeable synthetic resin film 10 and non-woven cloth 12 laminated thereon, with their inner sides facing each other and bonding the two sheets to each other along their peripheral edges with heat fusion. The constituent component B which gives rise to an endothermic action when mixed with the constituent component A is put in a small bag 14, which can be easily broken upon an impact being applied from the exterior, in a sealed state so that both the constituent components A and B are isolated from each other.

In use of such a simple cooling bag, an impact is applied to the flat bag 13 from the exterior with a fist or the like to break the inner small bag 14, whereupon both the constituent components A and B are mixed with each other to start cooling. Since the surface of the cooling bag is covered with non-woven cloth, a touch feeling is good and wetting caused by dew condensation is eliminated, with the result of a comfortable cool feeling.

Example 21

An 8-hydrate of strontium hydroxide of 40 g was put in a rectangular small bag of 50×100 mm, formed of a polyethylene film having a thickness of 20 microns, in a sealed state. This small bag was accommodated in a rectangular, flat bag of 105×175 mm, comprising a polyethylene film being 50 microns thick and non-woven cloth made of nylon (N5051, by Asahi Chemical Industry Co., Ltd.) laminated on the surface of the film, thereby completing a sample of the simple cooling bag.

An impact was applied to the cooling bag from the exterior to break the inner small bag at the atmospheric temperature 36° C. A thermometer using a thermocouple was then attached to the surface of the flat bag for measuring the temperature with intervals of 10 sec. As a result, the period of time required to reach 10° C. was 2 minutes, the duration of the cooled state not higher than 10° C. was 9 minutes, the attainable minimum temperature was −7° C., and further, no dew condensation was found on the bag surface.

Comparative Example 10

The temperature measurement was conducted in the same manner as Example 21 except that an aluminum laminated film formed by laminating polyester of 20 microns, an aluminum foil of 30 microns, and polyethylene of 50 microns successively was used as a material of the flat bag. As a result, the period of time required to reach 10° C. was 1.8 minutes, the duration of the cooled state not higher than 10° C. was 6 minutes, and the attainable minimum temperature was −13.5° C. Dew condensation was found on the whole surface of the bag.

Figure 3:
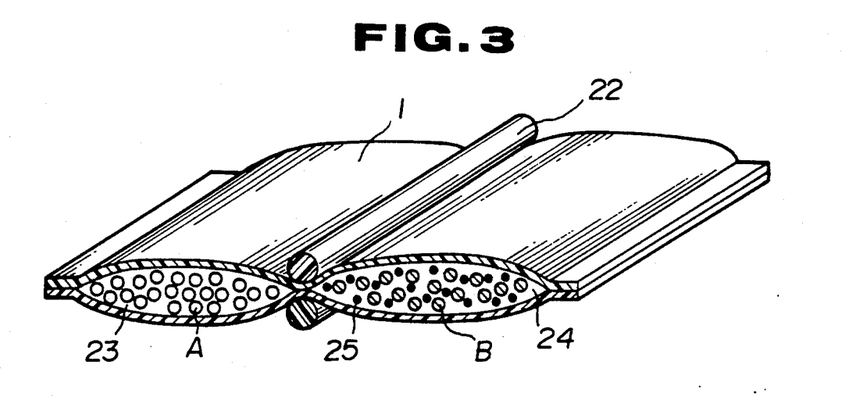
FIG. 3 is a perspective view, broken away, showing the state that the refrigerant of the present invention mixed with a coloring agent is accommodated in a colorless, transparent bag made of synthetic resins.

FIG. 3 shows the state that the interior of a rectangular, flat bag 1 is partitioned into two spaces 23 and 24 in a hermetically sealing manner by using a bar-like clip 22 clipped on the bag 1 substantially at the center thereof, the bag 1 being formed by placing two sheets of colorless, transparent synthetic resin films one above the other and bonding the two sheets to each other along their peripheral edges with heat fusion. One constituent component A contained in the refrigerant of the present invention is accommodated in the space 23, and the other constituent component B which is mixed with a coloring agent 25 and gives rise to an endothermic action when mixed with the constituent component A is accommodated in the space 24 in an isolated condition from each other.

In use of the cooling bag, by removing the bar-like clip 22 and applying vibrations to the bag such as by slightly shaking it with a hand, the constituent components A and B are mixed with each other to start an endothermic action. The mixed condition can be visually confirmed as the coloring agent in the constituent component B moves into the region of the constituent component A so that the whole contents of the bag is uniformly colored.

Example 22

Two sheets of colorless, transparent polyethylene films each having a thickness of 50 microns and cut into a rectangular shape of 100×200 mm were placed on one above the other and heat-sealed along the opposite long sides with a width of 5 mm, thereby preparing a flat bag open at the opposite ends. A bar-like metallic clip having a diameter of 6 mm and a length of 130 mm was clipped on the bag at the center thereof in a direction perpendicular to the opposite long sides for partitioning the interior of the bag into two spaces. Ammonium nitrate of 60 g was put as the constituent component A into one space through an opening at one short side of the bag, while an 8-hydrate of strontium hydroxide of 40 g mixed with bromthymol blue of 0.005 g for coloring was put as the constituent component B into the other space through an opening at the other short side of the bag, followed by hermetically heat-sealing the openings to complete a sample of the simple cooling bag.

Then, the bar-like clip was removed from the sample in an indoor space at the atmospheric temperature of 36° C. and the bag was slightly shaken while taking it with a hand to make both the constituent components A and B mix with each other. The mixing progress of the constituent components A and B could be clearly judged with a spread of the blue region. Correspondingly, the bag temperature gradually lowered and reached 10° C. after about 2 minutes.

It should be understood that not only the refrigerant of the present invention but also any other known refrigerant may be accommodated in each of the bags shown in FIGS. 1 to 3. Also, any other suitable product than the refrigerant may be accommodated in those bags so long as the product is used by mixing a plurality of constituent components with each other.

As fully explained above, since the refrigerant of the present invention uses a hydrate of strontium hydroxide, there can be obtained many superior features in practical use. Specifically, users can feel cool satisfactorily with the lower attainable cooling temperature of about −20° C. A longer duration of the cooled state and hence a larger cooling temperature area at 10° C. or below could not be achieved by the conventional refrigerant. Another advantage is that the refrigerant will not deteriorate due to melting or deterioration of crystals even where the atmospheric temperature becomes as high as 40° C. in the summer season or for other reasons and, therefore, can be stored in a stable condition for a long period of time.

Further, by accommodating the refrigerant in a bag provided with a hermetically sealing mechanism, different kinds of constituent components can be stored in a safely isolated condition without contacting each other. In use, the isolated condition can be easily removed to allow the constituent components to mix with each other sufficiently, resulting in an increased cooling effect.

Moreover, by accommodating the refrigerant in a bag formed by laminating non-woven cloth over an air impermeable film, it becomes possible to avoid wetting caused by dew condensation in use, prevent the bag surface from being cooled excessively, and also provide a comfortable cool feeling for a long period of time.

Additionally, by mixing a coloring agent with at least one of the constituent components in the refrigerant, a mixed condition of the plural constituent components can be precisely judged in a visual manner.

What is claimed is:

1. A refrigerant containing two or more constituent components that exhibit an endothermic action when mixed with each other, the refrigerant comprising as said constituent components:
   an inorganic salt; and
   a salt hydrate containing at least an 8-hydrate of strontium hydroxide,
   wherein said two or more constituent components are accommodated in a container which isolates said two or more constituent components from each other and, for cooling, the isolation is removed to make said constituent components mix with each other.

2. A refrigerant according to claim 1, wherein said inorganic salt is at least one of an inorganic ammonium salt and an alkaline metallic salt.

3. A refrigerant according to claim 2, wherein said inorganic ammonium salt is at least one of an ammonium nitrate, ammonium chloride, ammonium sulfate and ammonium bromide.

4. A refrigerant according to claim 1, wherein said salt hydrate consisting of a hydrate of strontium hydroxide.

5. A refrigerant according to claim 1, wherein said refrigerant further comprises as said salt hydrate at least one of a 9-hydrate of sodium methasilicate and an 8-hydrate of barium hydroxide.

6. A refrigerant according to claim 1, further comprising water.

7. A refrigerant according to claim 6, wherein said further comprises as said salt hydrate at least one of a 9-hydrate of sodium methasilicate and an 8-hydrate of barium hydroxide.

8. A refrigerant according to claim 6, wherein the content of the water is in a range of 0.1 to 5.0 in weight ratio with respect to said inorganic salt and the proportion of the hydrate of strontium hydroxide with respect to the whole of the solid constituent components is not more than 80% in weight.

9. A refrigerant according to claim 1, further comprising urea.

10. A refrigerant according to claim 9, wherein the content of the urea is in a range of 0.1 to 3.0 in weight ratio with respect to said inorganic salt.

11. A refrigerant according to claim 1, wherein the content of said salt hydrate is in a range of 0.1 to 10.0 in weight ratio with respect to said inorganic salt and the proportion of the hydrate of strontium hydroxide with respect to the whole salt hydrate is not less than 5% in weight.

12. A refrigerant according to claim 1, further comprising at least one of a highly water-absorptive substance and a viscosity improver.

13. A refrigerant according to claim 1, wherein said container is in the form of a bag which has a hermetically sealing mechanism adapted to partition the interior of said bag, said hermetically sealing mechanism serving to accommodate said constituent components in said bag in an isolated condition from each other and, in use for cooling, the isolated condition effected by said hermetically sealing mechanism being removed to make said constituent components mix with each other in said bag.

14. A refrigerant according to claim 13, wherein said hermetically sealing mechanism comprises a groove provided in one inner side of said bag and a rib provided on another inner side of said bag in an opposite relation to said groove.

15. A refrigerant according to claim 13, wherein a thumb tab is attached to an outer side of said bag at a location near said hermetically sealing mechanism for making the sealing engagement open.

16. A refrigerant according to claim 1, wherein said container is a bag and said bag is formed of a material prepared by laminating and fixing non-woven cloth on and to an outer side of an impermeable film.

17. A refrigerant according to claim 16, wherein said non-woven cloth is nylon, polyethylene, polypropylene, polyester or rayon.

18. A refrigerant according to claim 16, wherein said impermeable film is polyethylene, polypropylene, polyester, nylon or polyvinyl chloride, or a composite film made of more than one of those materials.

19. A refrigerant according to claim 1, wherein said container is in the form of a first bag, and a smaller second bag positioned in the first bag and easily breakable upon an impact being applied from the exterior, and a part of said constituent components is accommodated in said small bag.

20. A refrigerant according to claim 1, wherein a coloring agent is mixed with at least one of said two or more constituent components, these constituent components being accommodated in a partly transparent bag in an isolated condition from each other and, in use for cooling, the isolated condition being removed to make said constituent components mix with each other.

21. A refrigerant according to claim 20, wherein at least one side of said bag is formed of a transparent synthetic resin film.

22. A refrigerant according to claim 20, wherein coloring agents in different colors are mixed with different kinds of said constituent components, respectively.

* * * * *

UNITED STATES PATENT AND TRADEMARK OFFICE
CERTIFICATE OF CORRECTION

PATENT NO. : 5,261,241

DATED : November 16, 1993

INVENTOR(S) : KOICHI KITAHARA et al.

It is certified that error appears in the above-identified patent and that said Letters Patent is hereby corrected as shown below:

Col. 7, line 43, "nitrite" should be --nitrate--.

Signed and Sealed this

Nineteenth Day of July, 1994

Attest:

BRUCE LEHMAN

*Attesting Officer*     *Commissioner of Patents and Trademarks*